(12) United States Patent
Park et al.

(10) Patent No.: US 9,569,058 B2
(45) Date of Patent: Feb. 14, 2017

(54) METHOD FOR PROVIDING SPACE MARKET WIDGET, MARKET SERVER AND USER DEVICE THEREOF

(71) Applicants: KT CORPORATION, Seongnam-si (KR); Jae-Won Byun, Seongnam-si (KR)

(72) Inventors: Sung-Soo Park, Seoul (KR); Sung-Ho Byun, Seongnam-si (KR)

(73) Assignee: KT Corporation, Seongnam-si (KR)

( * ) Notice: Subject to any disclaimer, the term of this patent is extended or adjusted under 35 U.S.C. 154(b) by 211 days.

(21) Appl. No.: 13/717,123

(22) Filed: Dec. 17, 2012

(65) Prior Publication Data

US 2013/0159894 A1 Jun. 20, 2013

(30) Foreign Application Priority Data

Dec. 19, 2011 (KR) .......................... 10-2011-0137675

(51) Int. Cl.
*G06F 3/048* (2013.01)
*G06Q 50/18* (2012.01)
*G06Q 99/00* (2006.01)

(52) U.S. Cl.
CPC ............... *G06F 3/048* (2013.01); *G06Q 99/00* (2013.01)

(58) Field of Classification Search
CPC G06F 3/0486; G06F 17/3056; G06F 3/04817; G06F 17/30058; G06F 17/04817; G06F 3/048; G06Q 99/00

(Continued)

(56) References Cited

U.S. PATENT DOCUMENTS 5,953,532 A * 9/1999 Lochbaum ..................... 717/176
7,577,700 B2 * 8/2009 Tolson et al. .................. 709/202

(Continued)

FOREIGN PATENT DOCUMENTS

JP          2009141636 A    6/2009
KR    10-2006-0087840 A    8/2006

(Continued)

OTHER PUBLICATIONS

Amazon.com, "Getting Started with Amazon Appstore", as evidenced by the Internet Archive: http://www.amazon.com/gp/feature.html?ie=UTF8&docid=1000626391 Mar. 25, 2011.*

(Continued)

*Primary Examiner* — Andrew Tank
(74) *Attorney, Agent, or Firm* — Sughrue Mion, PLLC

(57) ABSTRACT

A method for providing a space market widget by a market server is disclosed. The method includes: generating the space market widget; forming applications related to the space market widget as objects arranged in the space market widget; transmitting the objects to a user device in which the space market widget is installed; requesting installation of objects moved to an arrangement space from a market space of the space market widget; and transmitting the applications corresponding to the moved objects to the user device so as to be installed in the user device, wherein the space market widget includes a market space displaying the objects that are not yet installed in the user device and an arrangement space arranging and displaying the objects installed in the user device.

14 Claims, 9 Drawing Sheets

(58) Field of Classification Search
USPC .................. 715/744, 749, 762, 769, 835; 705/27.1–27.2
See application file for complete search history.

(56) References Cited

U.S. PATENT DOCUMENTS

| | | | |
|---|---|---|---|
| 8,099,332 B2* | 1/2012 | Lemay et al. | 705/26.1 |
| 8,645,837 B2* | 2/2014 | Little | 715/735 |
| 8,656,293 B1* | 2/2014 | Webster et al. | 715/769 |
| 8,719,001 B1* | 5/2014 | Izdepski et al. | 703/22 |
| 8,775,957 B2* | 7/2014 | Kim | 715/765 |
| 2008/0034314 A1* | 2/2008 | Louch et al. | 715/778 |
| 2010/0095248 A1* | 4/2010 | Karstens | 715/846 |
| 2010/0175011 A1* | 7/2010 | Song et al. | 715/769 |
| 2011/0061010 A1* | 3/2011 | Wasko | 715/769 |
| 2012/0054055 A1* | 3/2012 | Vidovic et al. | 705/26.1 |
| 2012/0072312 A1* | 3/2012 | Lange et al. | 705/27.1 |
| 2012/0072871 A1* | 3/2012 | Seo et al. | 715/838 |
| 2013/0132868 A1* | 5/2013 | Hackett et al. | 715/760 |

FOREIGN PATENT DOCUMENTS

| | | |
|---|---|---|
| KR | 10-2011-0005555 A | 1/2011 |
| KR | 20110035571 A | 4/2011 |
| KR | 1020110068477 A | 6/2011 |
| WO | WO 03063474 A1 * | 7/2003 |

OTHER PUBLICATIONS

"10 Tips & Tricks to well use Android Market," IT World Article, dated Apr. 15, 2011.
"Using an Widget which can be seen in the Personal Computer and Smartphone in the Smart TV/Internet," Dec. 31, 2010, Internet Article retrieved from http://blog.daum.net/sirgw/17461984.

* cited by examiner

METHOD FOR PROVIDING SPACE MARKET WIDGET, MARKET SERVER AND USER DEVICE THEREOF

CROSS-REFERENCE TO RELATED APPLICATION

This application claims priority from Korean Patent Application No. 10-2011-0137675 filed in the Korean Intellectual Property Office on Dec. 19, 2011, the entire content of which is incorporated herein by reference in its entirety.

BACKGROUND (a) Field

Methods and apparatuses consistent with exemplary embodiments relate to a method for providing a space market widget, and a market server and a user device thereof.

(b) Description of the Related Art

An application market is a market that sells applications. Developers register applications in the application market and users access the application market to purchase the applications.

Referring to FIG. 1, in the conventional art, the application market has provided application lists.

In this case, a user installs applications in the user device one by one. Therefore, when the user wants to install a plurality of applications having high relevance, the user needs to download the applications from the application market one by one. Further, even though the user installs the plurality of applications in the user device, the user has no choice but to bind the applications in a folder and manage them. In addition, the user needs to check newly registered applications by accessing the application market at all times.

The above information disclosed in this Background section is only for enhancement of understanding of the background of the inventive concept and therefore it may contain information that does not form the prior art that is already known in this country to a person of ordinary skill in the art.

SUMMARY

Exemplary embodiments have been made in an effort to provide a method for providing a widget. The method may include installing the widget in a user device, sorting applications that can be installed in the widget based on application codes, and distributing the applications by arranging and displaying the related applications in the widget as objects; exemplary embodiments also provide a market server and a user device related to the method for providing a widget.

An exemplary embodiment provides a method for providing a widget, the method including: generating the widget; forming one or more objects of applications related to the widget, wherein the one or more objects are arranged in the widget; transmitting the one or more objects to a device in which the widget is installed; receiving an installation request related to an object moving to a first space from a second space of the widget, from the device; and transmitting an application corresponding to the moved object to the device so as to be installed in the device, wherein the widget includes the second space displaying objects that are not yet installed in the device and the first space arranging and displaying objects installed in the device.

The forming of the one or more objects may comprise: allocating a code of the widget to the applications related to the widget; transforming the applications having the codes into the one or more objects; and managing the applications and the one or more objects by mapping the applications and the one or more objects related to the widget.

The method for providing a widget may further comprise: transmitting an object corresponding to a new application to the device when new application related to the widget are registered.

The generating of the widget may comprise generating the widget that requests the application corresponding to the moved object from the server, wherein the moved object is the object moved to the first space from the market space.

The generating of the widget may comprise generating the widget that includes the first space having a background image, and executing an application corresponding to a selected object, wherein the selected object is an object selected among the one or more objects arranged in the first space.

The generating of the widget may comprise generating the widget that deletes an application corresponding to a deleted object from the device, wherein the deleted object is the object deleted among the one or more objects arranged in the first space.

Another exemplary embodiment provides a method for providing a widget, the method comprising: installing the widget from a server; receiving one or more objects of applications related to the widget from the server and displaying the received one or more objects in a second space of the widget; receiving movement information related a moved object moved to a first space of the widget from the second space, the object being moved by a user; requesting an application corresponding to the moved object; and receiving and installing the requested application from the server and displaying the moved object in the first space, wherein the widget comprises the second space displaying at least one of the one or more objects that is not yet installed in a device and the first space arranging and displaying at least one of the one or more objects installed in the device.

The displaying of the received objects may include displaying an object of a new application related to the widget.

The method for providing a widget may further comprise: executing an application corresponding to a selected object when at least one of the one or more objects of the first space is selected by the user.

The method for providing a widget may further comprise: deleting an application corresponding to a deleted object when the at least one of the one or more objects of the first space is deleted by the user.

The requesting of the application corresponding to the moved object may comprise: requesting payment information when the application corresponding to the moved object requires a charge; transmitting the payment information to the server; and requesting a download of the application corresponding to the moved object when payment is completed.

In the displaying of the moved object, the moved object may be arranged at a position that it is moved to by the user in the first space.

In the receiving of the movement information moving to the first space of the widget, the movement information may inform that the moved object is dragged to the first space from the second space by the user.

Still another exemplary embodiment provides a server providing a widget, the server including: a widget generator configured to generate the widget to be installed in a user device and the widget comprising a second space displaying second objects that are not yet installed in the device and a first space arranging and displaying the first objects installed in a the user device; an object generator configured to sort a plurality of applications related to the widget and form each of the plurality of applications as objects arranged in the widget; and a device interworking unit configured to transmit the objects related to the widget to the device in which the widget is installed and when an installation of an object is requested from the device, transmitting applications corresponding to the requested object to the installation device.

The widget generator may generate the widget including a background image in the first space.

The widget generator may generate the widget that installs applications corresponding to the arranged first objects when the first objects are arranged in the first space, and may execute an application corresponding to a selected object, wherein the selected object is an object selected among the first objects arranged in the first space.

The widget generator may generate the widget that requests an installation of an application corresponding to a moved object from the market server, wherein the moved object is an object moved to the first space from the second space.

The device interworking unit may transmit added objects to the device when the objects related to the widget are added to the object generator.

According to the exemplary embodiments, the server can provide the applications as a binded type through the widget. Further, the server can additionally develop the applications related to the widget and lead the purchase and installation of the applications by updating the objects of the applications in the widget. The user can receive the applications as the binded type through the widget installed in the user device without accessing the market server. Further, the user can simply install and manage the applications by arranging the applications in the widget.

DETAILED DESCRIPTION OF EXEMPLARY EMBODIMENTS

Figure 1:
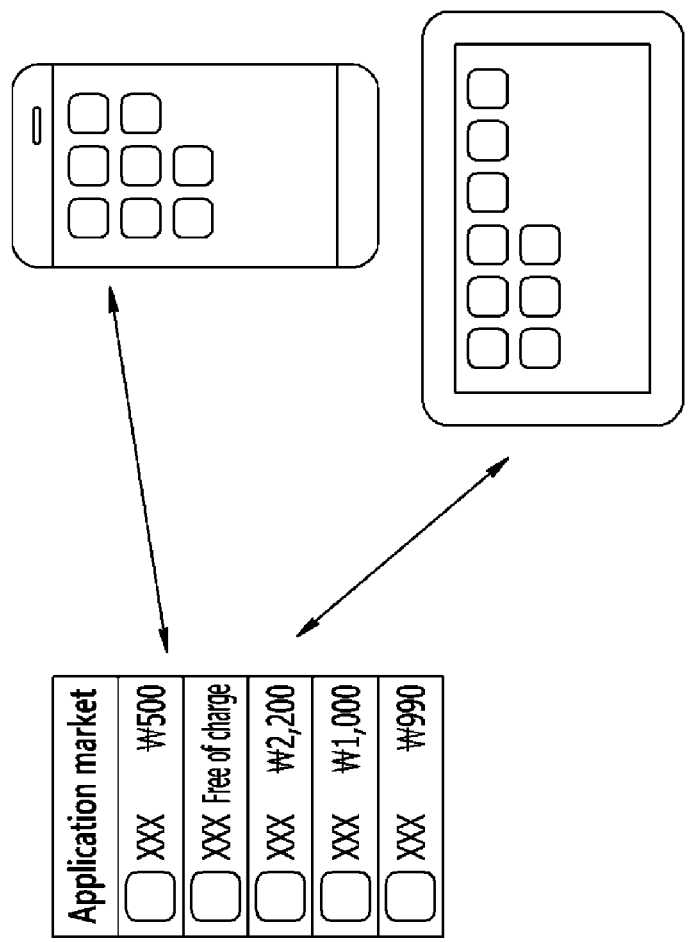
FIG. 1 is a diagram illustrating a method for providing applications according to related art.

In the following detailed description, only certain exemplary embodiments have been shown and described, simply by way of illustration. As those skilled in the art would realize, the described embodiments may be modified in various different ways, all without departing from the spirit or scope of the inventive concept. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements.

Hereinafter, a method for providing a space market widget and a market server and a user device thereof according to an exemplary embodiment will be described in detail with reference to the accompanying drawings.

Figure 2:
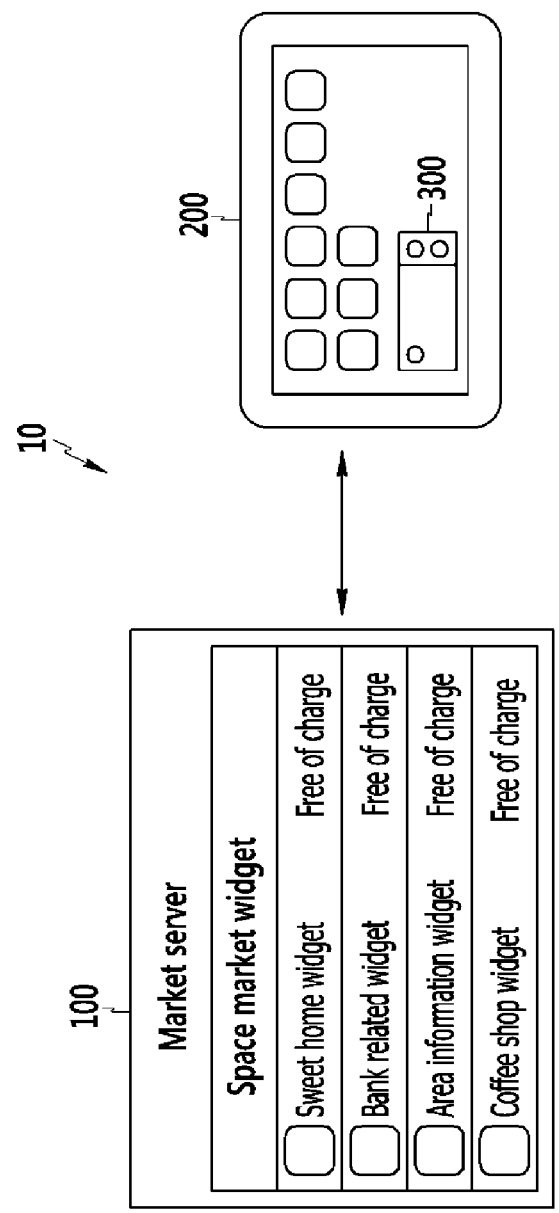
FIG. 2 is a schematic diagram of a market system according to an exemplary embodiment.

FIG. 2 is a schematic diagram of a market system according to an exemplary embodiment.

Referring to FIG. 2, a market system 10 includes a market server 100 and a user device 200. The market server 100 sells applications and the user device 200 purchases and downloads the applications from the market server 100.

The market server 100 provides a space market widget 300 to the user device 200. The market server 100 forms a group by binding the applications and sells the applications included in the group through the space market widget 300. That is, the market server 100 transmits related application information to the space market widget 300 when the space market widget 300 is installed in the user device 200. Further, the user device 200 acquires the application information related to the space market widget 300 at a time by installing the space market widget 300, and purchases, installs, and manages the applications through the space market widget 300.

The user device 200, which is a device used by a user, installs the space market widget 300. The user device 200 includes all the devices that can perform a function of the space market widget 300. For example, the user device 200 may be a portable communication terminal such as a smart phone, a smart pad, or the like, a TV type terminal such as an Internet protocol television (IPTV), a smart TV, or the like, or a computer type terminal such as a laptop, a tablet PC, or the like.

Figure 3:
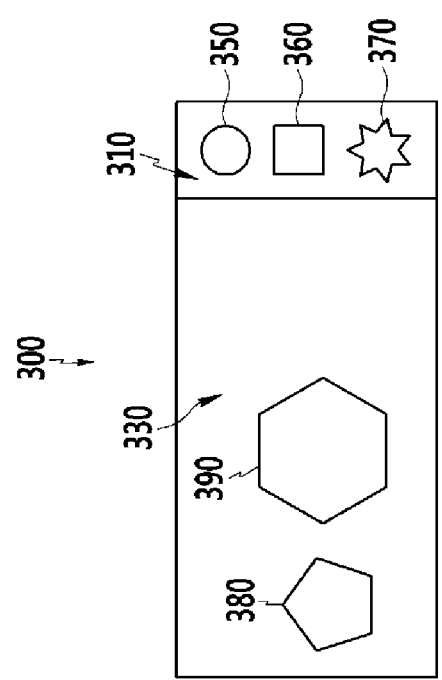
FIG. 3 is a schematic diagram of a space market widget according to an exemplary embodiment.

FIG. 3 is a diagram illustrating a space market widget according to an exemplary embodiment.

Referring to FIG. 3, the space market widget 300 includes a space that is divided into a market space 310 and an arrangement space 330. The market space 310 is a selling space of the applications and the arrangement space 330 is an installation space and an execution space of the applications. In this case, the space market widget 300 uses objects 350, 360, 370, 380, and 390 corresponding to the applications so as to visually display the applications in the space. The objects 350, 360, 370, 380, and 390 have images similar to icons and are displayed in the market space 310 and the arrangement space 330. For example, the market server 100 may display video calling applications as an object of a telephone image, the Internet TV application as an object of a television image, and a music related application as an object of a turntable image.

The market space 310 is a selling space in which the objects that can be used in the space market widget 300 are posted. When the market server 100 transmits the objects 350, 360, and 370 related to the space market widget 300 to the user device 200, the objects 350, 360, and 370 are displayed in the market space 310. The objects 350, 360, and 370 posted in the market space 310 are objects that are not yet installed in the user device 200.

The arrangement space 330 is an arrangement space in which the objects 380 and 390 installed in the user device 200 are arranged. The user may select and install the objects of the market space 310 even though he/she does not access the market server 100. When the user moves the object of the market space 310 to the arrangement space 330, the space market widget 300 accesses the market server 100 to download the application corresponding to the moving object. When the moved object requires a charge, the space market widget 300 receives payment information and then, installs the application corresponding to the moving object. The user may freely arrange the objects in the arrangement space 330. Further, when the user selects the objects 380 or 390 of the arrangement space 330, the corresponding application is executed. When the user deletes the objects 380 or 390 of the arrangement space 330, the corresponding application is deleted.

Figure 4:
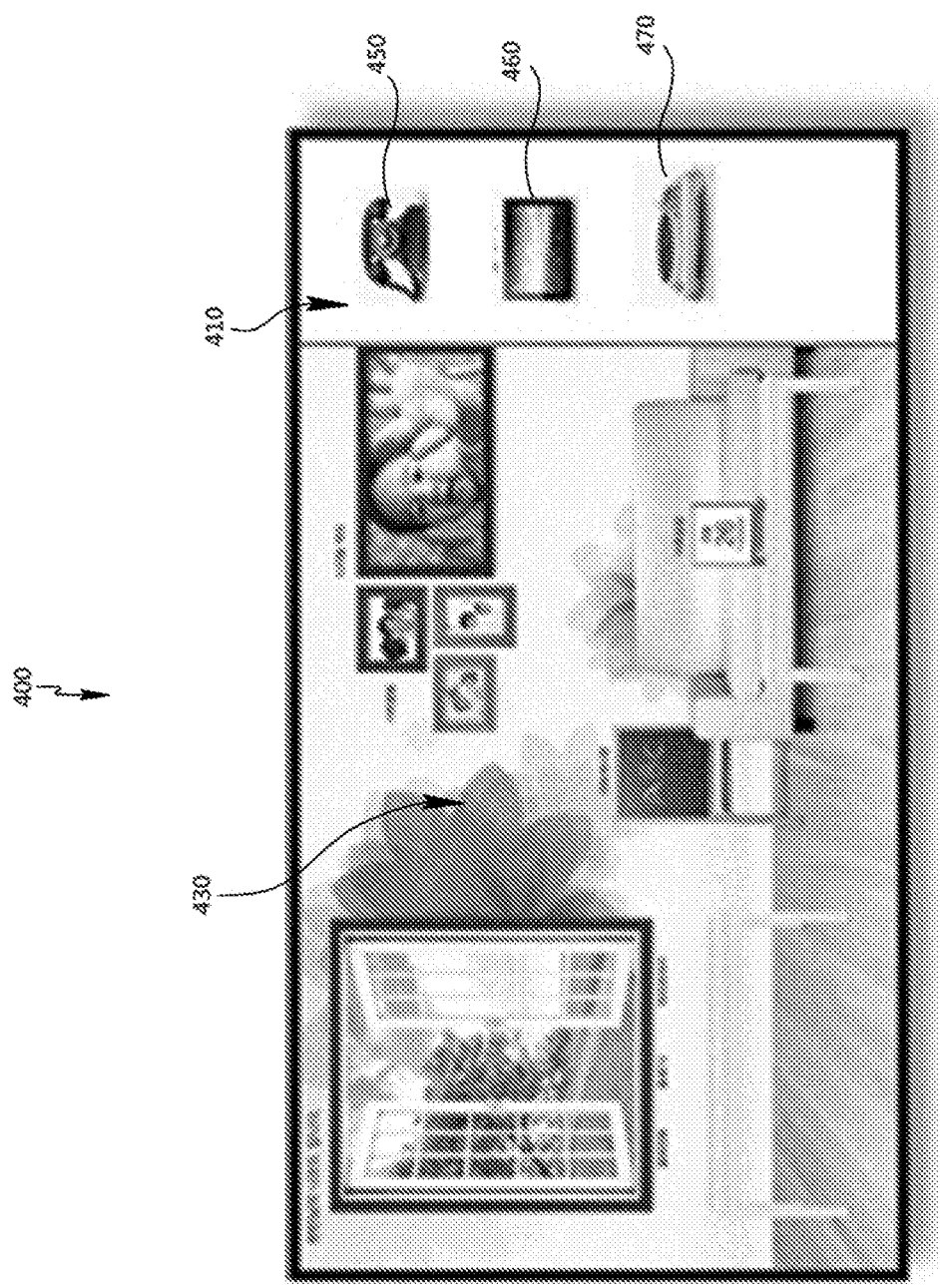
FIGS. 4 to 6 each are diagrams showing a method for using a space market widget according to an exemplary embodiment.
Figure 5:
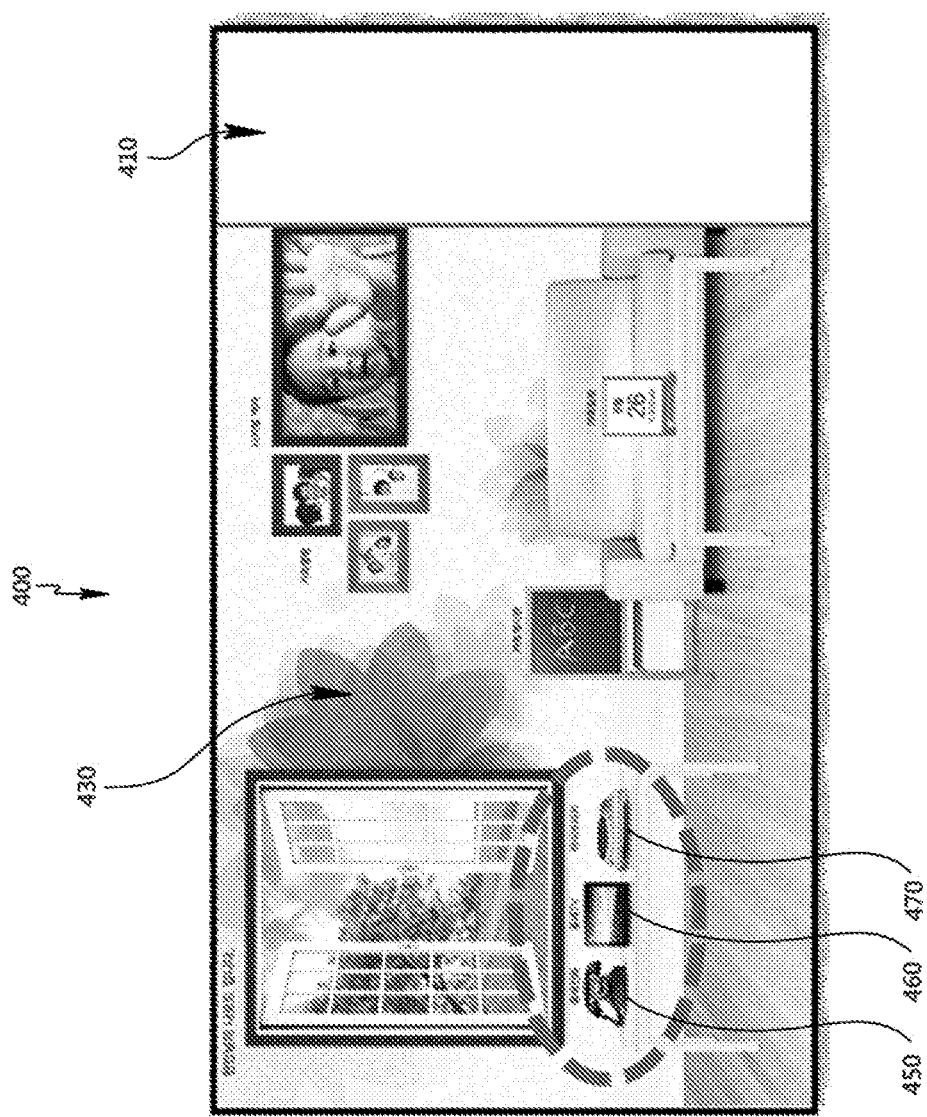
Figure 6:
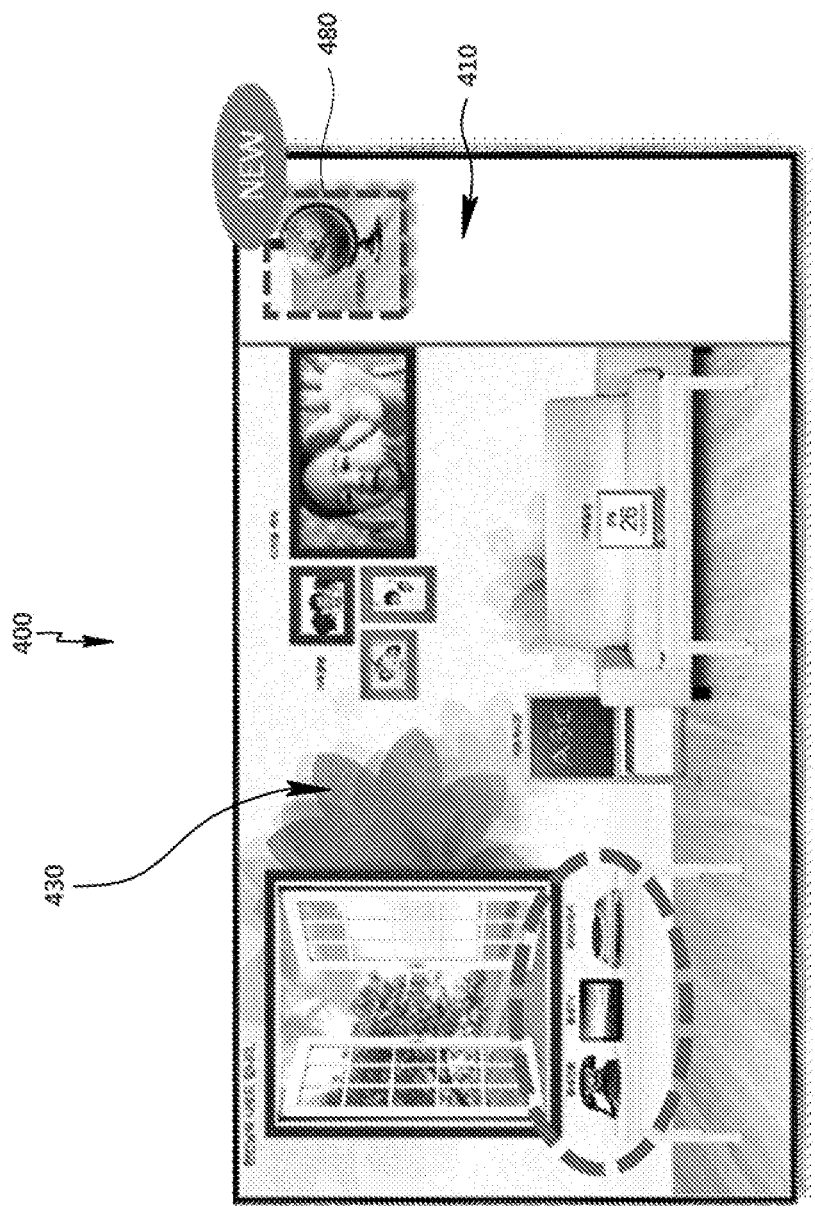

FIGS. 4 to 6 each are diagrams illustrating a method for using a space market widget according to an exemplary embodiment.

Referring first to FIG. 4, the user device 200 installs a space market widget 400 that provides smart home related applications. The space market widget 400 includes a market space 410 and an arrangement space 430. The arrangement space 430 of the space market widget 400 may be decorated with a background image related to the space market widget 400.

The market space 410 displays the objects 450, 460, and 470 that are provided from the space market widget 400. For example, the object 450 may be an object of the video calling application, the object 460 may be an object of the Internet TV application, and the object 470 may be a music related application. The objects 450, 460, and 470 are provided from the market server 100.

The user may drag the object of the market space 410 and may move to the arrangement space 430. As such, an operation of the user to move the objects may correspond to an installation request operation.

Referring to FIG. 5, the user moves the objects 450, 460, and 470 of the market space 410 to the arrangement space 430. In this case, the space market widget 400 transmits a request for installation of the applications corresponding to the objects 450, 460, and 470 to the market server 100. The market server 100 transmits the requested applications to the user device 200. In this case, the video calling application, the Internet TV application, and the music related application related to the objects 450, 460, and 470, respectively, are installed in the user device 200. Therefore, when the user selects the object 450 of the arrangement space 430, the video calling application is executed.

Referring to FIG. 6, the space market widget 400 receives the newly registered application information from the market server 100 and posts the received information in the market space 410. For example, when a new locating application related in the space market widget 400 is registered, the market server 100 transmits the object 480 corresponding to the locating application to the space market widget 400. In this case, the new object 480 is posted in the market space 410 of the space market widget 400.

Figure 7:
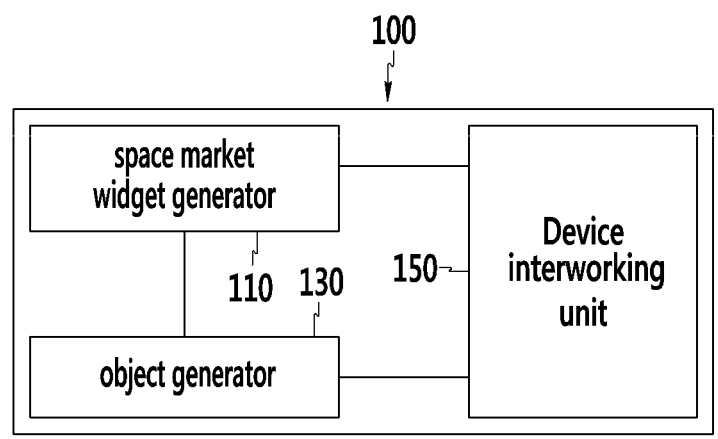
FIG. 7 is a block diagram of a market server according to an exemplary embodiment.

FIG. 7 is a block diagram of a market server according to an exemplary embodiment.

Referring to FIG. 7, the market server 100 includes a space market widget generator 110, an object generator 130, and a device interworking unit 150. The market server may further include a memory and/or processor. The generator 110, object generator 130, and device interworking unit 150 may be implemented as a hardware component, software module, or a combination of both hardware and software.

The space market widget generator 110 generates at least one space market widget. Referring to FIGS. 3 to 7, the space market widget is a widget that is installed in the user device 200 and sells, installs, and executes the related applications.

The object generator 130 sorts the plurality of applications related to the space market widget and forms each of the plurality of applications as an object that is arranged in the space market widget. The object generator 130 maps and manages the objects to the applications related to each space market widget. For example, the object generator 130 manages the object information corresponding to the applications as in Table 1. Further, the object generator 130 manages the related object information for each space market widget as in Table 2. In this case, the object generator 130 may manage the object image displayed in the space market widget as in Table 3 and the object information including the related space market widget information.

TABLE 1

| Application ID | Object ID |
|---|---|
| 00000001 | 77711231 |
| 00000007 | 88192199 |
| 00000011 | 00019991 |
| 00000014 | 87651123 |
| 00000027 | 62346688 |

TABLE 2

| Space Market Widget Sorting Code | Space Market Widget | Object ID |
|---|---|---|
| 0001 | Smart Home Space Widget | 62346688 |
| | | 77711231 |
| | | 87651123 |
| 0004 | Entertainment Space Widget | 88192199 |
| | | 77711231 |

TABLE 3

| Object ID | Object image | Space Market Widget Sorting Code |
|---|---|---|
| 77711231 |  | 0001 |

When a developer develops the applications and registers the developed applications in the market server 100, the market server 100 manages the applications by allocating application IDs to the applications. When the developer sells the applications to the space market widget, he/she selects the desired space market widget and registers the object information corresponding to the applications in the market server 100. In this case, the object generator 130 allocates object IDs and manages the object information corresponding to the applications as in Table 2.

The device interworking unit 150 transmits the objects related to the space market widget to the user device 200 in which the space market widget is installed. Further, when the device interworking unit 150 receives the installation request of any objects from the user device 200, the applications corresponding to any objects are transmitted to the user device 200. When the object related to the space market widget is added to the object generator 130, the device interworking unit 150 transmits the added object to the user device 200.

Figure 8:
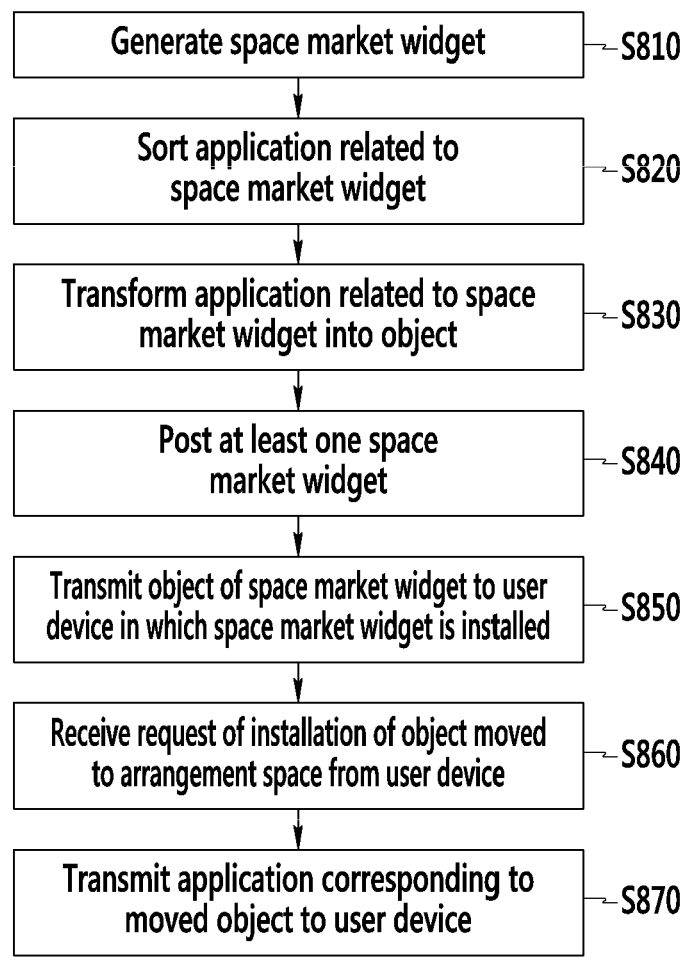
FIG. 8 is a flow chart of a method for providing a space market widget according to an exemplary embodiment.

FIG. 8 is a flow chart of a method for providing a space market widget according to an exemplary embodiment.

Referring to FIG. 8, the market server 100 generates the space market widget 300 (S810). The space market widget 300 is installed in the user device 200 to sell, install, and execute the related applications. To this end, the space market widget includes the market space 310 displaying the objects that are not installed in the user device 200 and the arrangement space 330 arranging and displaying the objects installed in the user device 200 in the space The space market widget 300 operates such that if the objects of the market space move to the arrangement space 330, the space market widget 300 transmits a request for the applications corresponding to the moved objects, to the market server 100. The space market widget 300 operates such that if the objects arranged in the arrangement space 330 are selected, the space market widget 300 executes the applications corresponding to the selected objects. The space market widget 300 operates such that if the objects arranged in the arrangement space 330 are deleted, the space market widget 300 deletes the applications corresponding to the deleted objects from the user device 200.

The market server 100 sorts the applications related to the space market widget 300 (S820). The market server 100 also may allocate and sort the codes of the applications related to the space market widget 300.

The market server 100 transforms the applications related to the space market widget 300 into the objects (S830). The market server 100 maps and manages the objects to the applications related to each space market widget.

The market server 100 posts at least one space market widget (S840).

When the user device 200 installs the space market widget, the market server 100 transmits the objects of the space market widget to the user device 200 (S850). When the market server 100 registers new applications, the objects corresponding to the new applications are formed, or generated, and transmitted to the user device.

The market server 100 receives a request for the installation of an application related to an object that is moved to the arrangement space from the market space of the space market widget, from the user device 200 (S860).

The market server 100 transmits the application corresponding to the moved object to the user device 200 (S870).

Figure 9:
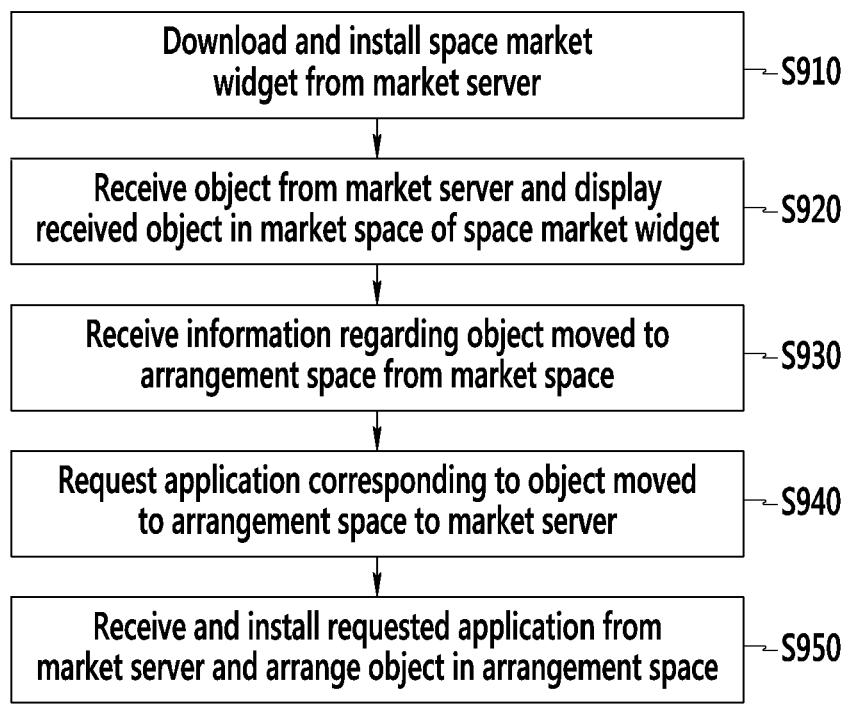
FIG. 9 is a flow chart of a method for providing a space market widget according to another exemplary embodiment.

FIG. 9 is a flow chart of a method for providing a space market widget according to another exemplary embodiment.

Referring to FIG. 9, the user device 200 downloads and installs the space market widget 300 from the market server 100 (S910). The user device 200 displays the space market widget 300 on a screen.

The user device 200 receives the objects 350, 360, and 370 of the applications related to the space market widget 300 from the market server 100 and displays the received objects 350, 360, and 370 in the market space 310 of the space market widget 300 (S920). The objects 350, 360, and 370 may be downloaded and displayed, together with the space market widget 300.

The user device 200 receives the movement information of the object, for example, the object 350, moved to the arrangement space 330 by the user (S930). When the user moves the object 350 to the arrangement space 330, the user device 200 recognizes the movement information of the object 350.

The user device 200 sends a request for the application corresponding to the object 350 that was moved to the arrangement space 330 to market server 100 (S940). In the space market widget 300, the arrangement space 330 is a space in which the installed objects are arranged and therefore, when the object 350 is moved to the arrangement space 330, the user device 200 communicates with the market server 100 so as to install the application corresponding to the object 350.

The user device 200 receives and installs the requested application from the market server 100 and arranges the object 350 in the arrangement space 330 (S950).

When the user selects the object 350 from the arrangement space 330, the user device 200 executes the application corresponding to the object 350. Further, when the user deletes the object 350 of the arrangement space 330, the user device 200 deletes the application corresponding to the object 350.

As such, the market server 100 may provide the applications as binded applications through the space market widget. Further, the market server 100 can additionally develop the applications related to the space market widget and lead the purchase and installation of the applications by updating the objects of the applications in the space market widget. The user can check the binded applications through the space market widget installed in the user device 200 without accessing the market server 100. Further, the user can simply install and manage the applications by arranging the applications in the space market widget.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A method for providing a widget by a market server, the method comprising:
   generating the widget;
   sorting market-applications into widget-applications related to the widget, wherein the market-applications are applications managed by the market server,
   forming one or more objects of the widget-application, wherein the one or more objects are arranged in the widget;
   transmitting the one or more objects to a device in which the widget is installed;
   receiving an installation request related to an object moved to a first space from a second space of the widget, from the device;
   transmitting an application corresponding to the moved object to the device after a payment of the moved object is completed;
   registering a new application as a new market-application;
   sorting the new application into a new widget-application related to the widget if the new application has a sorting identification code corresponding to the widget; and
   transmitting the new application's object to the device in which the widget is installed,
   wherein the widget comprises the second space displaying second objects that are not yet installed in the device and the first space displaying first objects installed in the device,
   wherein the widget requires the payment when one of the second objects is moved to the first space, and
   wherein the respective first objects are arranged freely in the first space, and are selected to execute the respective applications installed in the device.

2. The method of claim 1, wherein:
   the forming of the one or more objects comprises:
   allocating a code of the widget to the widget-applications related to the widget;

transforming the widget-applications having the code into the one or more objects; and managing the widget-applications and the one or more objects by mapping the widget-applications and the one or more objects related to the widget.

3. The method of claim 1, wherein:

the generating of the widget comprises:

generating the widget that requests the application corresponding to the moved object, from a server, wherein the moved object is the object moved to the first space from the second space.

4. The method of claim 1, wherein:

the generating of the widget comprises:

generating the widget that includes the first space having a background image, and executing an application corresponding to a selected object, wherein the selected object is an object selected among the one or more objects arranged in the first space.

5. The method of claim 1, wherein:

the generating of the widget comprises:

generating the widget that deletes an application corresponding to a deleted object from the device, wherein the deleted object is the object deleted from the one or more objects arranged in the first space.

6. A method for providing a widget by a device, the method comprising:

installing the widget downloaded from a server;

receiving one or more objects of widget-applications related to the widget from the server and displaying the one or more objects received in a second space of the widget;

receiving movement information related to an object moved to a first space of the widget from the second space, the object being moved by a user;

requesting an application corresponding to the moved object;

receiving and installing the requested application from the server and displaying the moved object in the first space; and receiving a new application's object from the server and displaying the new application's object in the second space, wherein the new application registered in the server is sorted into a new widget-application related to the widget as the new application has a sorting identification code corresponding to the widget, wherein the widget comprises the second space displaying at least one object among second objects that is not yet installed in a device and the first space displaying at least one object among first objects installed in the device, wherein the respective first objects are arranged freely in the first space, and are selected to execute the respective applications installed in the device, wherein:

the requesting of the application corresponding to the moved object comprises:

requesting for entering payment information to the user when the application corresponding to the moved object requires a charge;

transmitting the payment information to the server; and requesting a download of the application corresponding to the moved object when payment is completed.

7. The method of claim 6, further comprising:

executing an application corresponding to a selected object when at least one of the first objects of the first space is selected by the user.

8. The method of claim 6, further comprising:

deleting an application corresponding to a deleted object when at least one of the first objects of the first space is deleted by the user.

9. The method of claim 6, wherein:

the displaying of the moved object comprises:

displaying the moved object at a position that the moved object is moved to by the user in the first space.

10. The method of claim 6, wherein:

the receiving of the movement information comprises:

informing that the moved object is dragged to the first space from the second space by the user.

11. The method of claim 6, further comprising downloading the widget from the server.

12. A server providing a widget, the server comprising:

a widget generator processor which generates the widget to be installed in a device, the widget comprising a second space displaying second objects that are not yet installed in the device and a first space displaying first objects installed in the device, wherein the respective first objects are arranged freely in the first space;

an object generator processor which sorts market-applications into a plurality of widget-applications related to the widget and forms each of the plurality of widget-applications as objects arranged in the widget, wherein the market-applications are applications managed by a market server; and a device interworking processor which transmits the objects related to the widget to the device in which the widget is installed and when an installation of an object moved from the second space to the first space is requested from the device, transmits applications corresponding to the moved object to the device after the payment of the moved object is completed, wherein the widget requires the payment when one of the second objects is moved to the first space, wherein the widget generator generates the widget that installs applications corresponding to the first objects arranged in the first space, and executes an application corresponding to a selected object, wherein the selected object is selected among the first objects, wherein the object generator processor sorts a new application into a new widget-application related to the widget if the new application has a sorting identification code corresponding to the widget, and forms the new application's object, and wherein the device interworking processor transmits the new application's object to the device in which the widget is installed.

13. The server of claim 12, wherein:

the widget generator processor generates the widget, the widget comprising a background image in the first space.

14. The server of claim 12, wherein:

the widget generator processor generates the widget that requests an installation of an application corresponding to a moved object from the market server, wherein the moved object is an object moved to the first space from the second space.

* * * * *

UNITED STATES PATENT AND TRADEMARK OFFICE
CERTIFICATE OF CORRECTION

PATENT NO.        : 9,569,058 B2
APPLICATION NO.   : 13/717123
DATED             : February 14, 2017
INVENTOR(S)       : Sung-soo Park et al.

Page 1 of 1

It is certified that error appears in the above-identified patent and that said Letters Patent is hereby corrected as shown below:

On the Title Page

Applicant (71):
Delete "Jae-Won Byun, Seongnam-si, (KR)"

Signed and Sealed this
Twenty-third Day of May, 2017

Michelle K. Lee
*Director of the United States Patent and Trademark Office*